United States Patent
Bok et al.

(10) Patent No.: US 12,269,420 B2
(45) Date of Patent: Apr. 8, 2025

(54) WIRELESS SENSING SYSTEM OF SEAT POSITION AND CONTROL METHOD OF THE SAME

(71) Applicants: Hyundai Motor Company, Seoul (KR); Kia Corporation, Seoul (KR); Samsong Industries, Ltd., Seoul (KR)

(72) Inventors: Chang Kyu Bok, Seoul (KR); Dong Ryul Shin, Busan (KR); Su Cheon Kim, Incheon (KR); Yong Chan Yoon, Seoul (KR); Man Seok Kim, Changwon-si (KR)

(73) Assignees: HYUNDAI MOTOR COMPANY, Seoul (KR); KIA CORPORATION, Seoul (KR); SAMSONG INDUSTRIES, LTD., Seoul (KR)

( * ) Notice: Subject to any disclaimer, the term of this patent is extended or adjusted under 35 U.S.C. 154(b) by 274 days.

(21) Appl. No.: 17/820,099

(22) Filed: Aug. 16, 2022

(65) Prior Publication Data
US 2023/0226954 A1 Jul. 20, 2023

(30) Foreign Application Priority Data
Jan. 19, 2022 (KR) .......... 10-2022-0008023

(51) Int. Cl.
*B60R 22/48* (2006.01)
*B60N 2/00* (2006.01)
(Continued)

(52) U.S. Cl.
CPC ............ *B60R 22/48* (2013.01); *B60N 2/0035* (2023.08); *H01Q 1/3291* (2013.01);
(Continued)

(58) Field of Classification Search
CPC .. B60N 2/002; B60N 2/0035; B60N 2230/20; B60R 2022/4808; B60R 22/48; H01Q 1/3291; H04B 17/318
See application file for complete search history.

(56) References Cited

U.S. PATENT DOCUMENTS 10,752,206 B2 * 8/2020 Tinoco .................... B60R 22/48
10,991,225 B1 * 4/2021 Lyons .................... B60N 2/003
(Continued)

FOREIGN PATENT DOCUMENTS

DE 102020203974 A1 * 9/2021 .......... B60N 2/0244
DE 102021204301 A1 * 11/2022
(Continued)

*Primary Examiner* — Babar Sarwar
(74) *Attorney, Agent, or Firm* — MCDONNELL BOEHNEN HULBERT & BERGHOFF LLP (57) ABSTRACT

The present disclosure discloses a wireless sensing system of a seat position and a control method of the sensing system, the system including a slave control unit provided for each seat to detect a seat belt fastening status and a seat occupancy status by a passenger, and a master control unit provided in a vehicle to receive data based on a radio signal of the slave control unit through radio communication with each slave control unit, calculate a position of each slave control unit based on the data received through the radio communication, and discontinue a position checking of a slave control unit when it is determined that the position of the slave control unit calculated for each slave control unit is outside the vehicle.

12 Claims, 7 Drawing Sheets

(51) Int. Cl.
*B60N 2/26* (2006.01)
*H01Q 1/32* (2006.01)
*H04B 17/318* (2015.01)

(52) U.S. Cl.
CPC ............ *H04B 17/318* (2015.01); *B60N 2/268* (2023.08); *B60N 2/272* (2023.08); *B60N 2210/40* (2023.08); *B60N 2230/20* (2023.08); *B60R 2022/4808* (2013.01)

(56) References Cited

U.S. PATENT DOCUMENTS

| | | | |
|---|---|---|---|
| 11,230,246 B1 * | 1/2022 | Beach | B60R 21/01512 |
| 2005/0061568 A1 * | 3/2005 | Schondorf | B60R 22/48 |
| | | | 280/801.1 |
| 2014/0306838 A1 * | 10/2014 | Beumler | B60N 2/272 |
| | | | 340/988 |
| 2018/0345903 A1 * | 12/2018 | Ishibashi | B60R 22/48 |
| 2019/0256041 A1 * | 8/2019 | Tinoco | G01R 33/072 |
| 2020/0116847 A1 * | 4/2020 | Jeon | G01S 13/48 |
| 2020/0247357 A1 * | 8/2020 | Wengreen | B60R 22/48 |
| 2021/0101512 A1 * | 4/2021 | Shimizu | B60Q 9/00 |
| 2021/0347323 A1 * | 11/2021 | Thomas | B60R 21/01538 |
| 2023/0415614 A1 * | 12/2023 | Ito | B60N 2/882 |

FOREIGN PATENT DOCUMENTS

| | | | |
|---|---|---|---|
| DE | 102021117426 A1 * | 1/2023 | |
| JP | 2019043451 A * | 3/2019 | |
| JP | 2019001365 A * | 10/2019 | |
| WO | WO-2022177522 A1 * | 8/2022 | |

\* cited by examiner

Fig. 7

WIRELESS SENSING SYSTEM OF SEAT POSITION AND CONTROL METHOD OF THE SAME

CROSS REFERENCE TO RELATED APPLICATIONS

The present application claims priority to Korean Patent Application No. 10-2022-0008023, filed Jan. 19, 2022, the entire contents of which is incorporated herein for all purposes by this reference.

TECHNICAL FIELD

The present disclosure relates to a wireless sensing system of a seat position and a control method of the sensing system configured to discontinue the diagnosis of a seat installed in a vehicle when the seat position is changed or the seat is positioned outside the vehicle.

BACKGROUND

A seat belt reminder SBR is a device that induces the seat belt fastening by activating a warning light or an alarm when a passenger seated in a seat does not fasten a seat belt while the vehicle travels at a predetermined speed or higher.

In such a seat belt reminder, a buckle and an integrated central control unit ICU are electrically connected to each other through wiring so that a buckle fastening signal is transmitted to the ICU when the seat belt is fastened to the buckle, and the ICU connected to a vehicle controller through communication reports whether the seat belt is fastened.

On the other hand, a wireless seat belt reminder that transmits a signal that the seat belt is fastened to the buckle to the vehicle controller by radio has been recently proposed.

In such a wireless seat belt reminder, there is a problem in that an installed seat may not be properly recognized if the reminder is not installed in a predetermined position in the seat and that a seat occupancy status by a passenger as well as the seat belt fastening status in the seat may not be accurately checked consequently.

In addition, when a seat is detached from a vehicle such as an SUV or MPV in which a seat may be attached and detached, a signal from a sensor installed in the detached seat may not be received, and there is a problem in that a failure to receive the signal may be erroneously interpreted as a failure of a radio communication device for communicating with the seat.

The matters described above as a background of the present disclosure are intended only for a better understanding of the background of the present disclosure and are not to be taken as acknowledgment that they pertain to the conventional art already known to those skilled in the art.

SUMMARY

An object of the present disclosure is to provide a wireless sensing system of a seat position and a control method of the wireless sensing system configured to discontinue radio transmission and reception with a seat when the position of the seat installed inside a vehicle is changed or the seat is positioned outside the vehicle.

The wireless sensing system of a seat position includes a slave control unit provided for each seat to detect a seat belt fastening status and a seat occupancy status by a passenger, and a master control unit provided in a vehicle to receive data based on a radio signal of the slave control unit through radio communication with each slave control unit, calculate a position of each slave control unit based on the data received through the radio communication, and discontinue a position checking of a slave control unit when it is determined that the position of the slave control unit calculated for each slave control unit is outside the vehicle.

The master control unit may be configured to calculate the position of each slave control unit using a plurality of position calculation methods different from each other based on the data obtained through radio communication and to determine that a slave control unit is positioned outside the vehicle when the positions of the slave control unit calculated by each of the position calculation methods match and the calculated position of the slave control unit is out of a designated position range.

When the positions of a slave control unit calculated using the plurality of position calculation methods do not match, the slave control unit may be configured to be diagnosed as having a failure.

When the positions of a slave control unit calculated using the plurality of position calculation methods match and the calculated position of the slave control unit is not out of a designated position range, it may be determined that the slave control unit is normally positioned inside the vehicle.

A plurality of antennas are provided in the master control unit to respectively receive in-phase data (referred to as I data hereinafter) and quadrature data (referred to as Q data hereinafter) transmitted from each slave control unit, an I/Q value may be calculated from the received I data and Q data using an I/Q modulator, an angle of arrival (signal angle of arrival) of a signal transmitted from each slave control unit and a distance to a slave control unit may be calculated based on the calculated I/Q value so that the position of the slave control unit may be calculated.

At least two antennas may be installed in the master control unit, and the radio frequency signal transmitted from each slave control unit may be received through the antennas.

The antennas may be installed on the dashboard of the vehicle, on the front roof of the vehicle, on the rear roof of the vehicle, or behind the rear seat of the vehicle.

The angle of arrival and distance may be calculated for each slave control unit a predetermined number of times or more, and the moving average of the angle of arrival and distance calculated the predetermined number of times or more may be applied.

A plurality of antennas may be provided in the master control unit to respectively receive the received signal strength indicator data (referred to as RSSI data hereinafter) transmitted from each slave control unit, the angle of arrival (signal angle of arrival) of the signal transmitted from each slave control unit and distance to a slave control unit may be calculated based on the received RSSI data so that the position of the slave control unit may be calculated.

The angle of arrival and distance may be calculated for each slave control unit a predetermined number of times or more, and the moving average of the angle of arrival and distance calculated the predetermined number of times or more may be applied.

The slave control unit may be configured to be switched to a wake-up state upon receiving a wake-up signal, and the position of the slave control unit may be calculated immediately after the slave control unit wakes up.

The position of the slave control unit may not be calculated after the ignition of the vehicle is turned on.

When the position of the slave control unit is determined more than a predetermined number of times, the position of the slave control unit may not be calculated.

A control method of the wireless sensing system of a seat position includes receiving, by the master control unit, data based on the radio signal of the slave control unit through radio communication with a slave control unit provided for each seat, calculating, by the master control unit, the position of each slave control unit based on the data received through the radio communication, and discontinuing, by the master unit, a position checking of a slave control unit when it is determined that the position of the slave control unit calculated for each slave control unit is outside the vehicle.

According to the present disclosure, when it is determined that a seat is out of a designated installation position to be outside the vehicle, the data information detected through a slave control unit is not transmitted and received for the seat any further.

Accordingly, a faulty diagnosis of a failure caused by an absence of signal transmission from a seat that is not installed in the vehicle is prevented so that the merchantability and reliability of the wireless seat belt reminder system are improved.

DETAILED DESCRIPTION

A preferred embodiment of the present disclosure will be described with reference to the accompanying drawings in the following.

Figure 1:
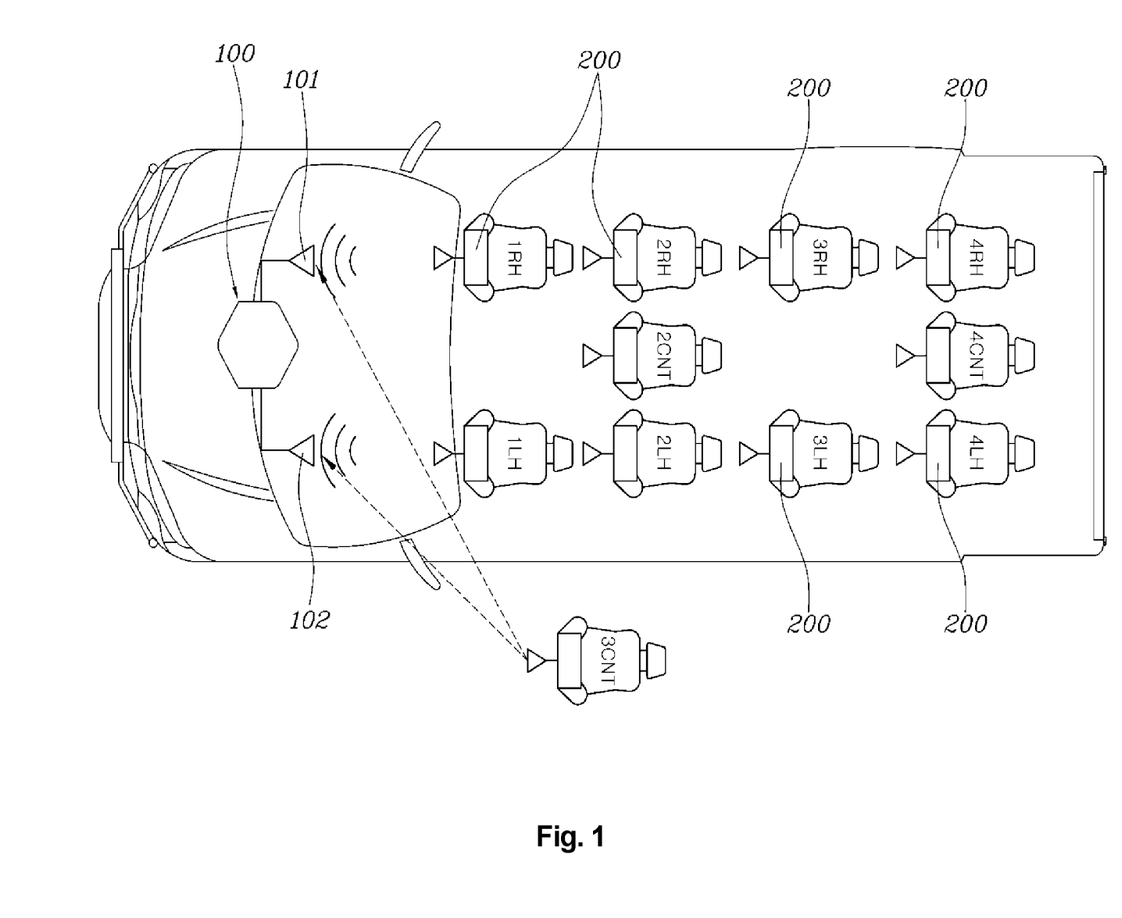
FIG. 1 is a view illustrating radio communication between a master control unit and a slave control unit installed in a center seat in a third row while the seat is detached from a vehicle according to the present disclosure.
Figure 2:
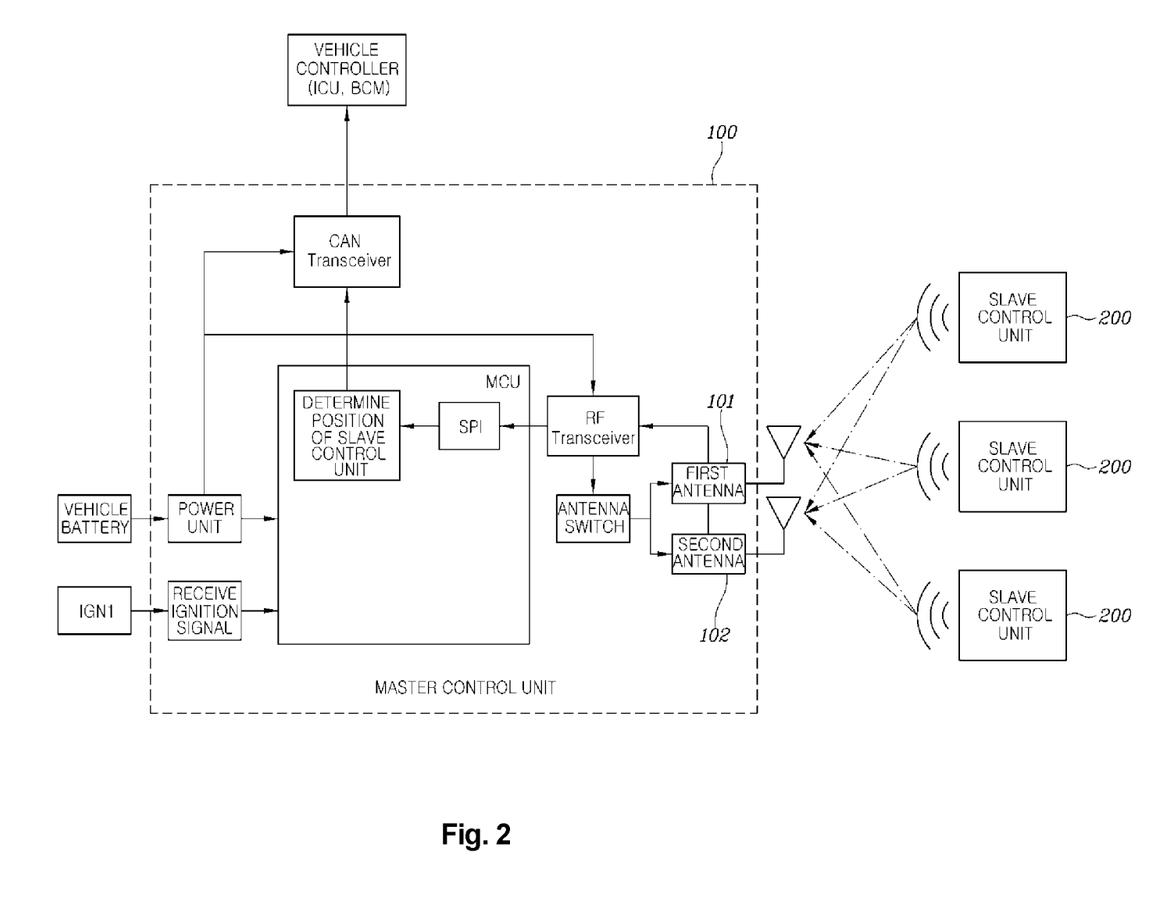
FIG. 2 is a view illustrating a configuration of a master control unit according to the present disclosure.

FIG. 1 is a view illustrating radio communication between a master control unit 100 and a slave control unit 200 installed in a center seat in a third row while the seat is detached from a vehicle according to the present disclosure, and FIG. 2 is a view illustrating a configuration of the master control unit 100 according to the present disclosure.

FIGS. 1 and 2 show that, according to the present disclosure, the wireless sensing system of a seat position includes a slave control unit 200 provided for each seat to detect a fastening status of a seat belt and a seat occupancy status by a passenger, and a master control unit 100 provided in a vehicle to receive data based on a radio signal of the slave control unit 200 through radio communication with the slave control unit 200, calculate a position of each slave control unit 200 based on the data received through the radio communication, and discontinue a position checking of a slave control unit 200 when it is determined that the position of the slave control unit 200 calculated for each slave control unit 200 is outside the vehicle.

For example, a seat belt sensor is installed in each seat to detect the fastening status of the seat belt.

Such a seat belt sensor is turned on and off depending on the fastening status of a tongue to be fastened to a buckle, and the seat belt sensor may be connected to the slave control unit 200 so that the fastening status of the seat belt may be determined.

For reference, a buckle switch may be used for the seat belt sensor, and another embodiment of the seat belt sensor may employ a contact switch, a Hall sensor, a resistance sensor, a vision sensor, and the like.

In addition, a pressure detection unit may be further installed in each seat to detect the presence or absence of a seated passenger by detecting a pressure of a seated passenger in a seat.

The pressure detection unit may be connected to the slave control unit 200 and thus, may determine whether a passenger is seated in the seat.

For reference, an automatic locking retractor ALR may be further included in addition to the seat belt sensor and the pressure detection unit, and whether a car seat is mounted may be determined based on the detection result of the ALR sensor and the pressure detection unit.

In addition, a buckle tension sensor BTS may be further included, and whether a car seat is mounted may be determined based on the detection result of the BTS sensor and the pressure detection unit.

In addition, a warning light may be installed on the buckle to alert to an unfastened state of the seat belt when the seat belt is unfastened.

For example, a buckle light switch operating the warning light may be provided together with the buckle switch detecting a fastening operation of the tongue to the buckle, and an illuminating warning light such as LED is installed on the buckle.

When the tongue remains unfastened to the buckle, operating the warning light installed on the buckle facilitates the seat belt fastening in a dark environment and induces the seat belt fastening.

For reference, other examples of devices alerting to the unfastened state of the seat belt are a warning device mounted inside the seat, sound (alarm, warning voice), tactile sensation (seat vibration, seat belt vibration), and the like that may be used in alerting to the unfastened state of the seat belt.

In addition, the master control unit 100 receives system data transmitted from each slave control unit 200 by radio and checks the failure status of the slave control unit 200, unsuccessful state of transmission and reception, a low battery level, and the like based on the received system data.

In particular, the master control unit 100 senses the position of each seat based on the radio signal transmitted from each slave control unit 200 and analyzes the difference between the sensed position of each seat and the installation position of each seat designated in advance to check whether the seat is out of the designated position.

When it is determined that the seat is out of a designated position to be outside the vehicle, detection of a seat belt fastening status as detected through the slave control unit 200, detection of seat occupation status, radio transmission/ reception operation to operate a warning light against an unfastened seat belt are not performed for the seat any further.

Accordingly, a faulty diagnosis of a failure caused by an absence of signal transmission from a seat that is not installed in the vehicle is prevented so that the merchantability and reliability of the wireless seat belt reminder system are improved.

For reference, according to an embodiment of the present disclosure, the control unit may be implemented through a processor (not shown) configured to perform operations to be described below using nonvolatile memory (not shown) configured to store algorithm configured to control operations of various components of a vehicle or data relating to the software commands for playing the algorithm or data stored in the corresponding memory. Here, the memory or the processor may be implemented as separate chips. Alternatively, the memory and the processor may be implemented as a single integrated chip. The processor may take the form of one or more processors.

In addition, according to the present disclosure, the master control unit 100 calculates the position of each slave control unit 200 using a plurality of position calculation methods different from each other based on the data obtained through radio communication and determines that a slave control unit 200 is positioned outside the vehicle when the positions of the slave control unit 200 calculated by each of position calculation methods match and the calculated position of the slave control unit 200 is out of a designated position range.

Figure 3:
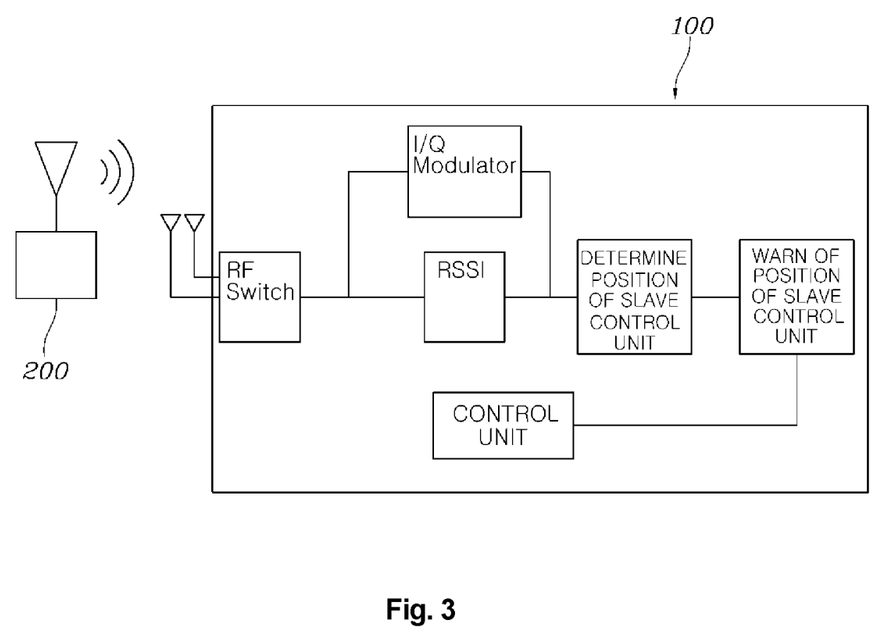
FIG. 3 is a circuit diagram conceptually illustrating a process of calculating a position of a slave control unit and performing a position warning by a master control unit according to the present disclosure.

FIG. 3 is a circuit diagram conceptually illustrating a process of calculating a position of a slave control unit 200 and performing a position warning by the master control unit 100 according to the present disclosure.

FIG. 3 shows that the position of the slave control unit 200 may be calculated for each seat using two position calculation methods and that the two position calculation methods may be a method using I(In-Phase) data and Q(Quadrature) data and a method using RSSI (Received Signal Strength Indicator) data according to the present disclosure.

The two position calculation methods will be described in detail below.

When a comparison between the positions of the slave control unit 200 calculated by the two methods for each seat shows that the calculated positions of each slave control unit 200 match and that the calculated position of a slave control unit 200 is out of the designated range, it is determined that the seat in which the slave control unit 200 is mounted is detached or positioned outside the vehicle.

In this case, an alert is issued to the seat, in which a slave control unit 200 is mounted, being positioned out of the designated position, and in particular, when it is determined that the seat is positioned outside the vehicle, a check switch for selecting to check the slave control unit 200 is turned off so that detection of seat belt fastening status, detection of seat occupancy status, operation of a warning light against an unfastened seat belt are not performed for the seat.

In addition, when the positions of a slave control unit 200 calculated using the plurality of position calculation methods do not match, the slave control unit may be diagnosed as having a failure.

That is, when a comparison between the positions of the slave control unit 200 calculated by the two methods for each seat shows that the positions of a slave control unit 200 do not match, the seat position may not be specified.

In this case, the position of the slave control unit 200 is recalculated and the positions of the slave control unit 200 recalculated by the two methods are compared. When the recalculated positions remain unmatched more than a predetermined number of times, the master control unit 100 or the slave control unit 200 is diagnosed as having a failure and the logic is terminated.

In contrast, when the positions of a slave control unit 200 calculated using the plurality of position calculation methods match and the calculated position of the slave control unit 200 is not out of a designated position range, it may be determined that the slave control unit 200 is normally positioned inside the vehicle.

That is, when a comparison between the positions of a slave control unit 200 calculated by the two methods for each seat shows that the positions of the slave control unit 200 match and that the calculated position of the slave control unit 200 is within a designated range, it is determined that the seat in which the slave control unit 200 is mounted is installed at a position inside the vehicle.

In this case, detection of seat belt fastening status, detection of seat occupancy status, and operation of a warning light against an unfastened seat belt continue to be performed for the seat.

For reference, the control units illustrated in FIG. 3 may transmit antenna switch control to be described below, diagnosis switch control, and system data signal of the slave control unit 200 to be described below to other controllers (body controller or vehicle controller) to warn of a failure of each slave control unit 200. In addition, diagnosis management of failure status of the master control unit 100, diagnosis management, data management, and the like may be performed.

A method of using I data and Q data, of the two position calculation methods, will be described.

Figure 4:
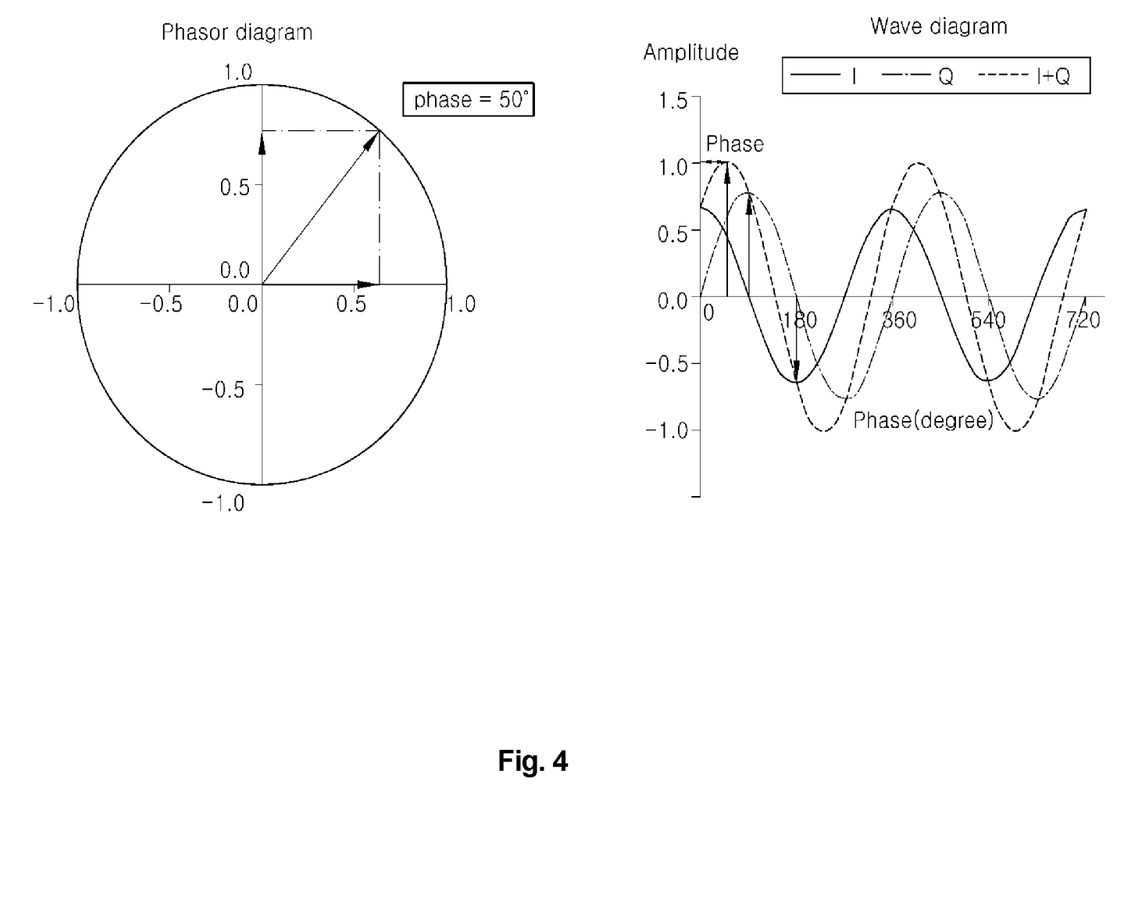
FIG. 4 is a view illustrating a method of calculating a phase angle using an I/Q modulator in the present disclosure.
Figure 5:
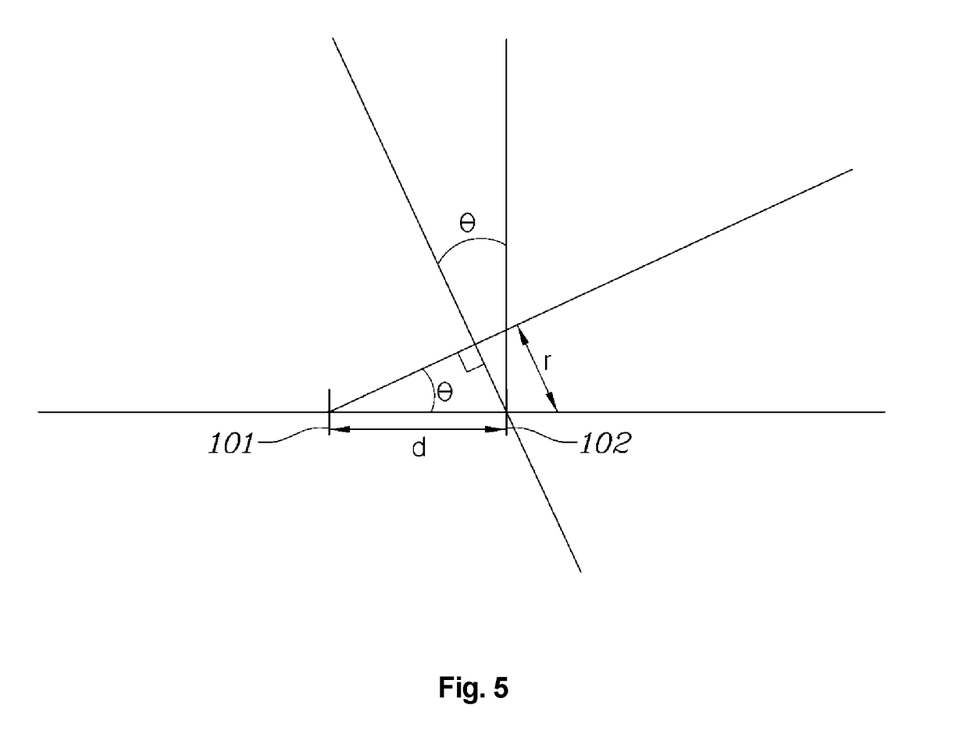
FIG. 5 is a view illustrating a method of calculating an angle of arrival using an I/Q modulator in the present disclosure.

FIG. 4 is a view illustrating a method of calculating a phase angle using an I/Q modulator in the present disclosure, and FIG. 5 is a view illustrating a method of calculating an angle of arrival using an I/Q modulator in the present disclosure.

FIGS. 4 and 5 show that a plurality of antennas are provided in the master control unit 100 to respectively receive I data and Q data transmitted from each slave control unit 200, that an I/Q value is calculated from the received I data and Q data using an I/Q modulator, and that an angle of arrival (signal angle of arrival) of a signal transmitted from each slave control unit 200 and a distance to a slave control unit 200 are calculated based on the calculated I/Q value so that the position of the slave control unit 200 is calculated.

Specifically, at least two antennas may be installed in the master control unit 100, and the present disclosure will be described with an exemplary configuration of two antennas: a first antenna 101 and a second antenna 102.

That is, a radio frequency signal transmitted from each slave control unit 200 is received through the two antennas.

The frequency signal received through the antennas is Bluetooth Low Energy BLF in the radio frequency RF 2.4 GHz band, but other low-power RF (315, 433, 425-435 MHz) bands may be used.

The distance between the two antennas is to be maintained at half the frequency wavelength $\lambda$.

For reference, the antennas may be installed on the dashboard of the vehicle, but the installation of the antenna is not limited thereto.

That is, the antenna may be installed on the dashboard of the vehicle, on the front roof of the vehicle, on the rear roof of the vehicle, or behind the rear seat of the vehicle.

An ID is assigned to each slave control unit 200, and the first antenna 101 and the second antenna 102 for each ID respectively receive the I data and Q data, and RSSI data.

The I data and Q data, and RSSI data are received and stored in a short time through antenna switching.

As illustrated in FIG. 4, the I/Q value is calculated using the I/Q modulator and stored.

The phase angle Φ is obtained based on the calculated I/Q value.

As illustrated in FIG. 5, the length of frequency wavelength λ of the radio wave used in the phase angle Φ and the distance d between the two antennas are obtained, and then, the angle of arrival AoA is calculated using the following formulae:

$$\sin(\theta) = \frac{r}{d}$$

$$r = \frac{\lambda \phi}{2\pi}$$

$$r = d \sin(\theta)$$

$$\theta = \arcsin\left(\frac{\lambda \phi}{2\pi d}\right)$$

For example, since the frequency of Bluetooth is 2.4 GHz and the speed of light is 3×10$^8$ m/s, the wavelength of the frequency is 0.123 m when Bluetooth is used as a radio frequency:

3×10$^8$ m/s/2.4 GHz=0.123 m

At this time, the distance between the two antennas is to be maintained at half the frequency of the wavelength λ or less, and the wavelength of the Bluetooth is 0.123 m so that the distance between the two antennas is to be maintained at 6.15 m or less.

Figure 6:
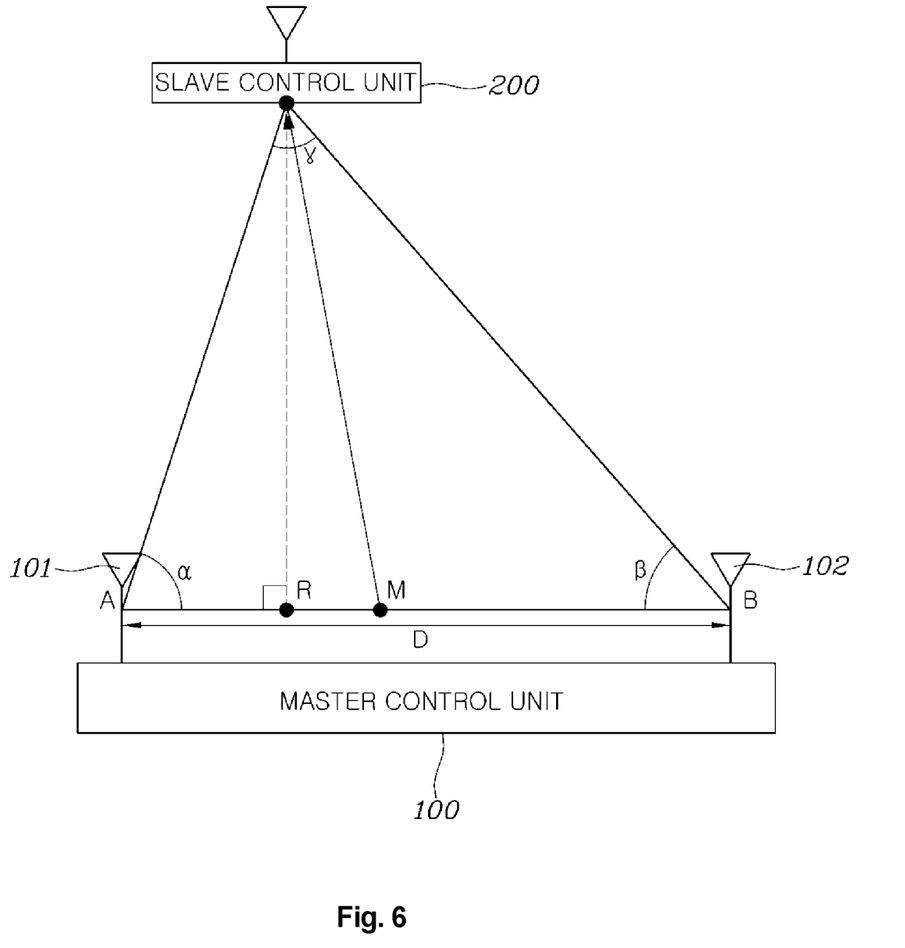
FIG. 6 is a view for describing a method of calculating a distance between a master control unit and a slave control unit and a method of calculating an angle of arrival using RSSI in the present disclosure.

In addition, FIG. 6 is a view for describing a method of calculating the distance between the master control unit 100 and the slave control unit 200. The distance between the master control unit 100 and the slave control unit 200 is calculated by the following formula:

$$M\text{Slave}=\sqrt{(RM)^2+(R\text{Slave})^2},$$

where

Mslave: distance between the master control unit 100 and the slave control unit 200, R: right angle point between the master control unit 100 and the slave control unit 200, M: midpoint between the first antenna 101 and the second antenna 102, RM: distance between R and M, and RSlave: right angle distance between the master control unit 100 and the slave control unit 200.

The distance RM may be obtained from formulae satisfying the following conditions:

if) α>β

$$RM=AR-AM=(A\text{slave}*\cos \alpha)-(AB/2)$$

if) α<β

$$RM=AM-BR=(AB/2)-(B\text{slave}*\cos \beta)$$

if) α==β

RM=0 where

Aslave: distance between the slave control unit 200 and the first antenna 101, and Bslave: distance between the slave control unit 200 and the second antenna 102.

The distances Aslave and Bslave may be obtained by the following formulae:

$$A\text{slave}=(AB*\sin \beta)/\sin \gamma$$

$$B\text{slave}=(AB*\sin \alpha)/\sin \gamma$$

That is, the distance Mslave between the master control unit 100 and the slave control unit 200 is obtained using the above formulae, so that the seat position may be detected.

Also, the angle of arrival and the distance are calculated for each slave control unit 200 using the I data and Q data a predetermined number of times or more, and the moving average of the angle of arrival and the distance calculated the predetermined number of times or more may be applied.

For example, when the angle of arrival and distance are calculated ten times, the moving average of the angle of arrival and distance calculated ten times are compared with the angle of arrival and distance calculated using the angle of arrival and distance calculated using the RSSI data to determine a match or a mismatch.

Next, a method of using the RSSI data, of the two position calculation methods, is described.

FIG. 6 shows that a plurality of antennas is provided in the master control unit 100 to respectively receive RSSI data transmitted from each slave control unit 200 and that the angle of arrival of signal (signal arrival angle) transmitted from each slave control unit 200 and the distance to a slave control unit 200 are calculated based on the received the RSSI data so that the position of the slave control unit 200 may be calculated.

For example, as described above, an ID is assigned to each slave control unit 200, and the I data and Q data, and the RSSI data are received in a short time at each of the first antenna 101 and the second antenna 102 for each ID and stored through antenna switching.

In the case of RSSI data, the received data may be filtered using the moving average method, Kalman filter, and the like.

The position and distance are calculated using RSSI formula and stored for each ID.

FIG. 6 shows that the RSSI formula may be defined as:

$$RSSI=-10n \times \log \times A\text{slave}+T\text{xpower},$$

where

Aslave: distance between the slave control unit 200 and the first antenna 101, Txpower: transmission energy, and n: correction constant (usually when there is no obstacle).

Here, the distances of Aslave and Bslave, may be calculated by the following formulae:

$$A\text{slave}=10^{((Txpower-A\_RSSI)/(10 \times n))} \text{ and}$$

$$B\text{slave}=10^{((Txpower-B\_RSSI)/(10 \times n))}$$

α, β may be calculated using the second cosine law by the following formulae:

$$\alpha=\arccos((A\text{slave}^2+D^2-B\text{slave}^2)/(2 \times D \times A\text{slave}))$$

$$\beta=\arccos((B\text{slave}^2+D^2-A\text{slave}^2)/(2 \times D \times B\text{slave}))$$

Through this, γ is obtained and the angle of arrival is calculated.

The distance between the master control unit 100 and the slave control unit 200 is calculated by the following formula:

$$M\text{Slave} = \sqrt{(RM)^2 + (R\text{Slave})^2}$$

where

Mslave: distance between the master control unit 100 and the slave control unit 200, R: right angle point between the master control unit 100 and the slave control unit 200, M: midpoint between the first antenna 101 and the second antenna 102, RM: distance between R and M, and Rslave: right angle distance between the master control unit 100 and the slave control unit 200.

That is, the distance Mslave between the master control unit 100 and the slave control unit 200 and the angle of arrival are obtained using the above RSSI formula so that the seat position is detected.

For reference, a method of using the RSSI formula is described to calculate the distance between the master control unit 100 and the slave control unit 200 based on the RSSI, but the distance may be calculated using a regression formula, artificial intelligence, and the like designated in the vehicle development stage.

In addition, the angle of arrival and distance may be calculated for each slave control unit 200 using the RSSI formula a predetermined number of times or more, and the moving average of the angle of arrival and distance calculated a predetermined number of times or more may be applied.

For example, when the angle of arrival and distance are calculated ten times, the moving average of the angle of arrival and distance calculated ten times are compared with the angle of arrival and distance calculated using the RSSI data to determine a match or a mismatch.

On the other hand, according to the present disclosure, the slave control unit 200 switches to a wake-up state upon receiving a wake-up signal in a sleep state of the slave control unit 200, and the position of the slave control unit 200 may be calculated immediately after the slave control unit 200 wakes up.

For example, when the body controller transmits the wake-up signal through a low-frequency radio (LF: 125 kHz) transmitter, which is a low-frequency signal transmission device, the wake-up signal may be received through the LF receiver provided in each slave control unit 200 when a vehicle door opens.

For reference, in some cases, the wake-up signal may be set to be received when a seat is occupied, a seat belt is fastened or unfastened, and the like.

In this way, the slave control unit 200 is initialized after receiving the wake-up signal for the slave control unit 200, and when the initialization of the slave control unit 200 is successful, each slave control unit 200 transmits system data relating to a seat belt fastening status, alerting status to an unfastened seat belt, a seat occupancy status, a battery state, and a failure status of the slave control unit 200, and the master control unit 100 receives the system data.

The master control unit 100 determines whether the system data is received based on the ID of each slave control unit 200, and when the system data is normally received by the master control unit 100, a reception confirmation signal is transmitted to each slave control unit 200.

When the signal is received from each slave control unit 200, the antennas respectively receive and store the I/Q data and RSSI data using an RF switch in the master control unit 100 so that the position of each slave control unit 200 is calculated by the methods described above.

According to the present disclosure, when the slave control unit 200 wakes up before passengers get into the vehicle, the master control unit 100 operates to calculate the position of the slave control unit 200 so that an impact on the calculation of the I/Q value and RSSI value is minimized.

For reference, when the transmission of system data is completed, each slave control unit 200 switches to the sleep state.

Here, the sleep state is a state in which the slave control unit 200 does not operate and refers to a state in which all power supplied to the slave control unit 200 is cut off.

In addition, according to the present disclosure, the position of the slave control unit 200 may not be calculated after the ignition of the vehicle is turned on.

That is, after the position of the slave control unit 200 is calculated when the slave control unit 200 wakes up, the position of the slave control unit 200 is not calculated after the ignition is turned on.

In addition, according to the present disclosure, when the position of the slave control unit 200 is determined a predetermined number of times or more, the position of the slave control unit 200 may not be calculated.

That is, when the position of the slave control unit 200 is calculated using the calculation result by the I/Q value and RSSI value more than three times, the position of the slave control unit 200 is not calculated.

Figure 7:
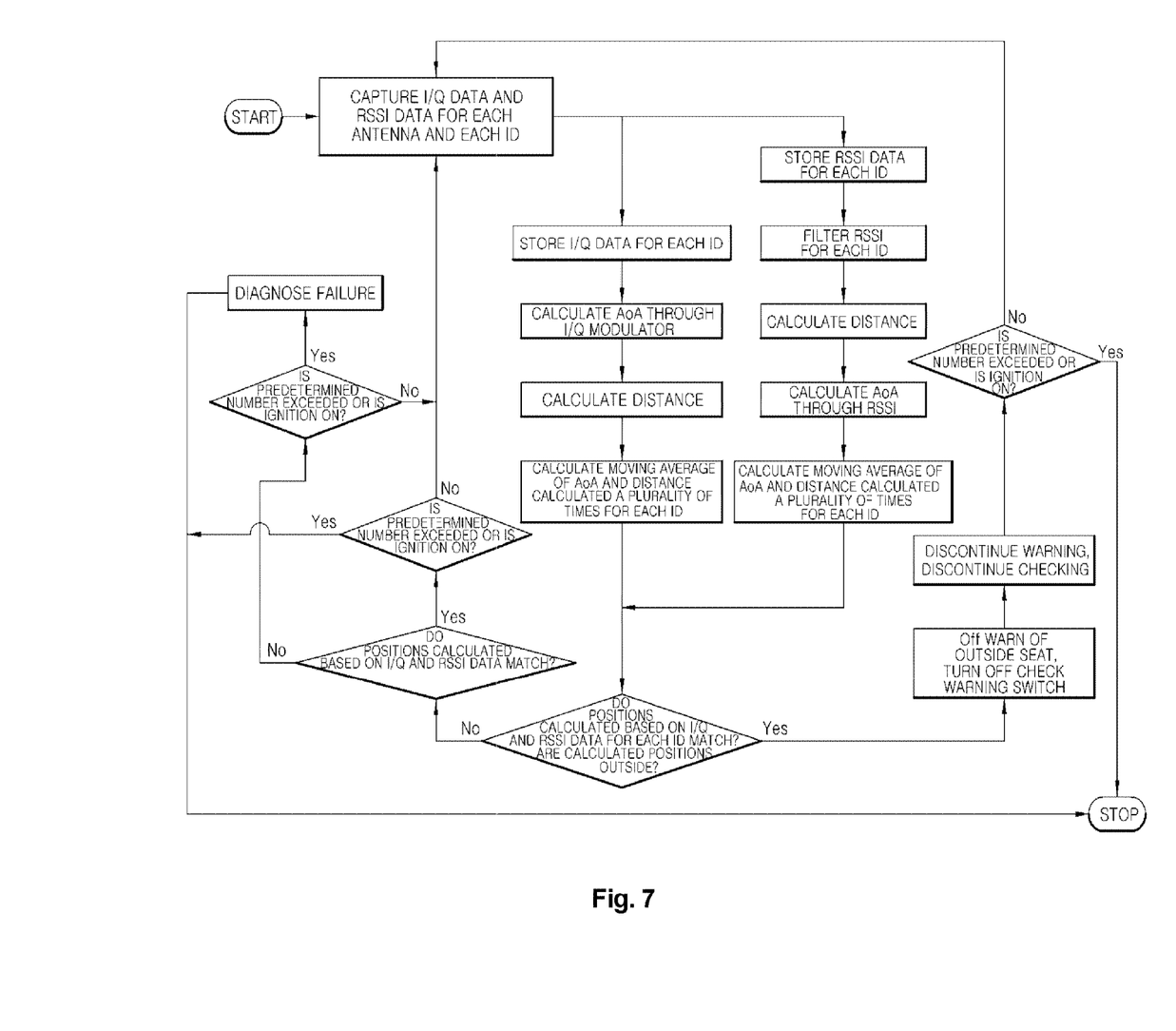
FIG. 7 is a flowchart of a control process of sensing a seat position and warning, using a wireless sensing system of a seat position according to the present disclosure.

FIG. 7 is a flowchart of a control process of sensing a seat position and warning, using a wireless sensing system of a seat position according to the present disclosure.

FIG. 7 shows that, according to the present disclosure, a control method of a wireless sensing system of a seat position includes receiving, by the master control unit 100 provided in the vehicle, data based on a radio signal of the slave control unit 200 through radio communication with the slave control unit 200 provided for each set, calculating, by the master control unit 100, the position of each slave control unit 200 based on the data received through radio communication, and discontinuing, by the master control unit 100, position checking of a slave control unit 200 when the position of the slave control unit 200 calculated for each slave control unit 200 is determined to be outside the vehicle.

An operating process of the wireless sensing system of a seat position according to the present disclosure will be described with reference to FIG. 7.

When a wake-up signal is received by each slave control unit 200 from the body controller in the sleep state of the slave control unit 200 when the door opens, the slave control unit 200 proceeds with the initialization process.

If the initialization of the slave control unit 200 is successful, system data of the slave control unit 200 relating to a seat belt fastening status, an alerting status to an unfastened seat belt, a seat occupancy status, a battery 114 state, a failure status of the slave control unit 200 is prepared for transmission in a message packet form.

Next, when the message is ready for transmission, the message is transmitted from each slave control unit 200, and whether the transmitted message is normally received by the master control unit 100 is determined.

When it is determined that the system data transmitted from the slave control unit 200 is normally received by the master control unit 100, an ID is assigned to the slave control unit 200, the first antenna 101 and the second antenna 102 are switched using the RF switch for each ID, and the antennas respectively capture and store the I/Q data and RSSI data.

In addition, the master control unit 100 transmits a reception confirmation signal tailored to the ID of the slave control unit 200.

Next, the angle of arrival is calculated through the I/Q modulator, and the distance between the master control unit 100 and the slave control unit 200 is calculated.

The angle of arrival and distance is calculated using the I/Q value a plurality of times, and the angle of arrival and distance are finally obtained using the I/Q method by the moving average of the plurality of calculated angle of arrivals and distances.

In addition, the RSSI value is filtered for each ID, and then the distance between the master control unit 100 and the slave control unit 200 is calculated, and the angle of arrival is finally calculated using an RSSI formula.

The angle of arrival and the distance are calculated using the RSSI value a plurality of times, and the angle of arrival and distance are finally obtained using the RSSI method by the moving average of the angle of arrival and distance calculated a plurality of times.

Next, whether the position of the slave control unit 200 calculated by the I/Q value matches the position of the slave control unit 200 calculated by the RSSI value is determined for each ID, and whether the positions of the slave control unit 200 calculated by the I/Q value and RSSI value are out of a designated position range.

When it is determined that the positions of a slave control unit 200 calculated by the I/Q value and RSSI value match and are out of the designated position range, that the seat in which the slave control unit 200 is installed is positioned outside the vehicle is warned and the switch for checking the slave control unit 200 is turned off so that seat belt fastening check, seat occupancy check, and operation of a warning light against an unfastened seat belt are not performed.

Next, when the position of the slave control unit 200 is determined more than a predetermined number of times or until the ignition is turned on, and then the logic is terminated.

In contrast, when it is determined, as a result of comparison between the positions of the slave control unit 200 calculated by I/Q value and RSSI value, that both the condition that positions of the slave control unit 200 calculated by the I/Q value and RSSI value do not match and the condition that the positions of the slave control unit 200 calculated by the I/Q value and RSSI value are not out of the designated position range are not satisfied, whether the positions of the slave control unit 200 calculated by the I/Q value and RSSII value match is determined.

When it is determined, as a result of the comparison, that the positions of the slave control unit 200 calculated by the I/Q value and RSSI value match, that the position of the slave control unit 200 is not out of the designated position range, it is determined that the seat is normally mounted.

In this case, the position of the slave control unit 200 is determined more than a predetermined number of times or until the ignition is turned on, and then, the logic is terminated.

In contrast, when it is determined, as a result of comparison between the positions of the slave control unit 200 calculated by the I/Q value and RSSI value, that both the condition that positions of the slave control unit 200 calculated by the I/Q value and RSSI value do not match and the condition that the positions of the slave control unit 200 calculated by the I/Q value and RSSI value are not out of the designated position range are not satisfied, whether the positions of the slave control unit 200 calculated by the I/Q value and RSSII value match is determined.

When it is determined that the positions of the slave control unit 200 calculated by I/Q value and RSSI value do not match, the position of the slave control unit 200 may not be specified.

When the calculated positions of the slave control unit 200 remain unmatched when the position of the slave control unit 200 is determined more than a predetermined number of times or until the ignition is turned on, the master control unit 100 or the slave control unit 200 are diagnosed as having a failure and the logic is terminated.

As described above, according to the present disclosure, when it is determined that a seat is out of the designated installation position to be out of the vehicle, the data information detected through the slave control unit 200 is not transmitted and received for the seat any further.

Accordingly, a faulty diagnosis of a failure caused by the absence of signal transmission from a seat that is not installed in the vehicle is prevented so that the merchantability and reliability of the wireless seat belt reminder system are improved.

Only the specific embodiments of the present disclosure are described in detail, but it is obvious to those skilled in the art that various alterations and modifications are possible within the scope of the technical spirit, and it is natural that such alterations and modifications fall within the scope of the accompanying claims.

What is claimed is:

1. A wireless sensing system of a seat position, comprising:
   a slave control unit provided for each seat to detect a seat belt fastening status and a seat occupancy status by a passenger; and
   a master control unit provided in a vehicle to receive data based on a radio signal of the slave control unit through radio communication with the slave control unit for each seat, calculate a position of the slave control unit for each seat based on the data received through radio communication, and discontinue a position checking of the slave control unit by turning off a check switch for selecting to check the slave control unit when it is determined that the position of the slave control unit calculated for the slave control unit for each seat is outside the vehicle,
   wherein the master control unit is configured to calculate the position of the slave control unit for each seat using a plurality of position calculation methods different from each other based on the data obtained through the radio communication and to determine that the slave control unit is positioned outside the vehicle when the positions of the slave control unit calculated by each of the position calculation methods match and the calculated position of the slave control unit is out of a designated position range, and
   wherein the slave control unit is configured to be diagnosed as having a failure when the positions of the slave control unit calculated using the plurality of position calculation methods do not match.

2. The wireless sensing system of claim 1, wherein it is determined that the slave control unit is normally positioned inside the vehicle when the positions of the slave control unit calculated using the plurality of position calculation methods match and the calculated position of the slave control unit is not out of the designated position range.

3. The wireless sensing system of claim 1, wherein
a plurality of antennas are provided in the master control unit to respectively receive in-phase data (I data) and quadrature data (Q data) transmitted from the slave control unit for each seat,
an I/Q value is calculated with the received I data and Q data using an I/Q modulator, and
an angle of arrival of a signal transmitted from the slave control unit for each seat and a distance to the slave control unit are calculated based on the calculated I/Q value to calculate the position of the slave control unit.

4. The wireless sensing system of claim 3, wherein at least two antennas are provided in the master control unit, and radio frequency signals transmitted from the slave control unit for each seat are received through the antennas.

5. The wireless sensing system of claim 3, wherein the antennas may be installed on a dashboard of the vehicle, on a front roof of the vehicle, on a rear roof of the vehicle, or behind a rear seat of the vehicle.

6. The wireless sensing system of claim 3, wherein
the angle of arrival and the distance are calculated for the slave control unit for each seat a predetermined number of times or more, and
a moving average of the angle of arrival and distance calculated a predetermined number of times or more are applied.

7. The wireless sensing system of claim 1, wherein
a plurality of antennas are provided in the master control unit to respectively receive signal strength indicator data (RSSI data) transmitted from the slave control unit for each seat, and
an angle of arrival of a signal transmitted from the slave control unit for each seat and the distance to the slave control unit are calculated based on the received RSSI data to calculate the position of the slave control unit.

8. The wireless sensing system of claim 7, wherein
the angle of arrival and the distance are calculated for the slave control unit for each seat a predetermined number of times or more, and
a moving average of the angle of arrival and the distance calculated a predetermined number of times or more are applied.

9. The wireless sensing system of claim 1, wherein
the slave control unit is configured to be switched to a wake-up state upon receiving a wake-up signal, and
the position of the slave control unit is calculated immediately after the slave control unit wakes up.

10. The wireless sensing system of claim 1, wherein the position of the slave control unit is not calculated after an ignition of the vehicle is turned on.

11. The wireless sensing system of claim 1, wherein the position of the slave control unit is not calculated when the position of the slave control unit is calculated more than a predetermined number of times.

12. A control method of a wireless sensing system of a seat position, the control method comprising:
receiving, by a master control unit provided in a vehicle, data based on a radio signal of a slave control unit through radio communication with the slave control unit provided for each seat;
calculating, by the master control unit, a position of the slave control unit for each seat based on the data received through the radio communication; and
discontinuing, by the master control unit, a position checking of the slave control unit by turning off a check switch for selecting to check the slave control unit when it is determined that the position of the slave control unit calculated for the slave control unit for each seat is outside the vehicle,
wherein the master control unit is configured to calculate the position of the slave control unit for each seat using a plurality of position calculation methods different from each other based on the data obtained through the radio communication and to determine that the slave control unit is positioned outside the vehicle when the positions of the slave control unit calculated by each of the position calculation methods match and the calculated position of the slave control unit is out of a designated position range, and
wherein the slave control unit is configured to be diagnosed as having a failure when the positions of the slave control unit calculated using the plurality of position calculation methods do not match.

\* \* \* \* \*